Patented June 12, 1928.

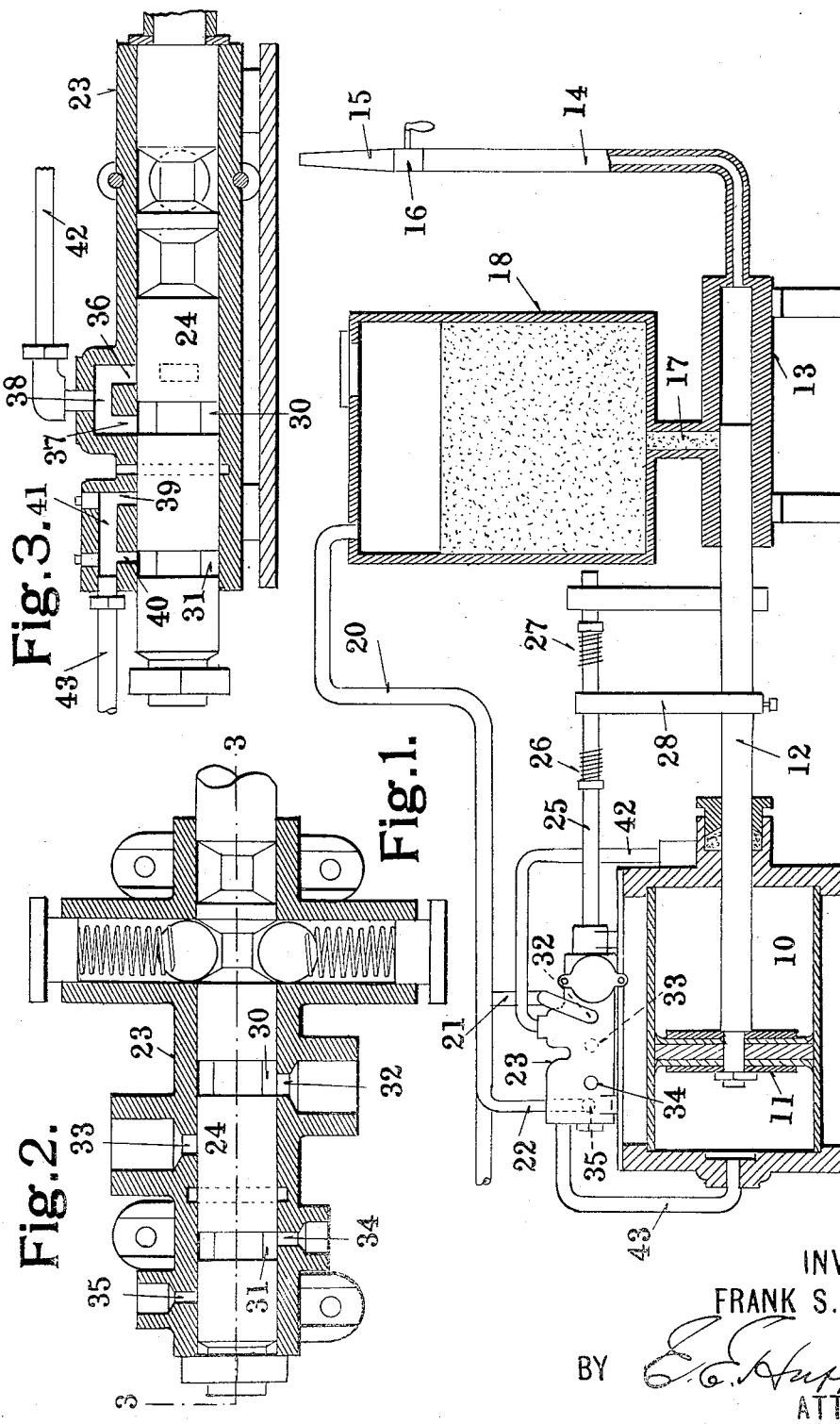

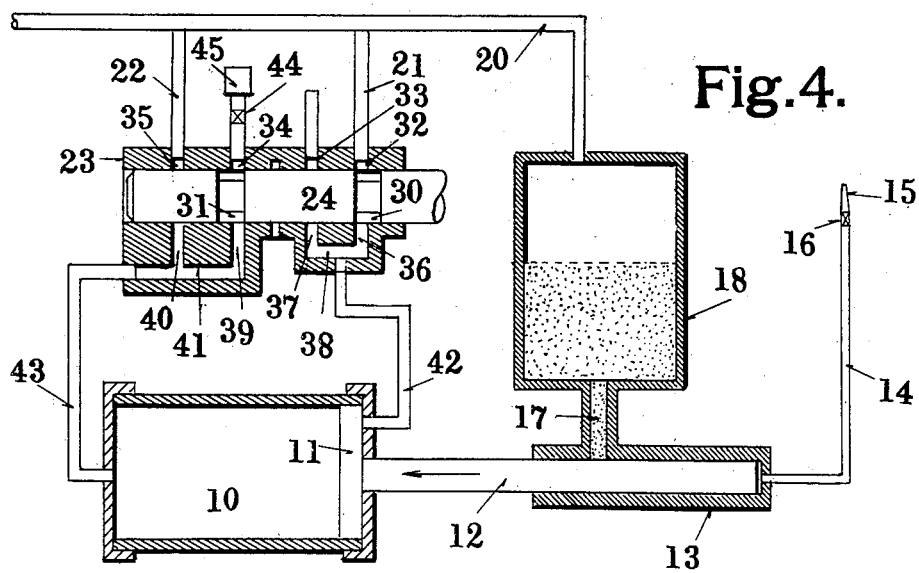
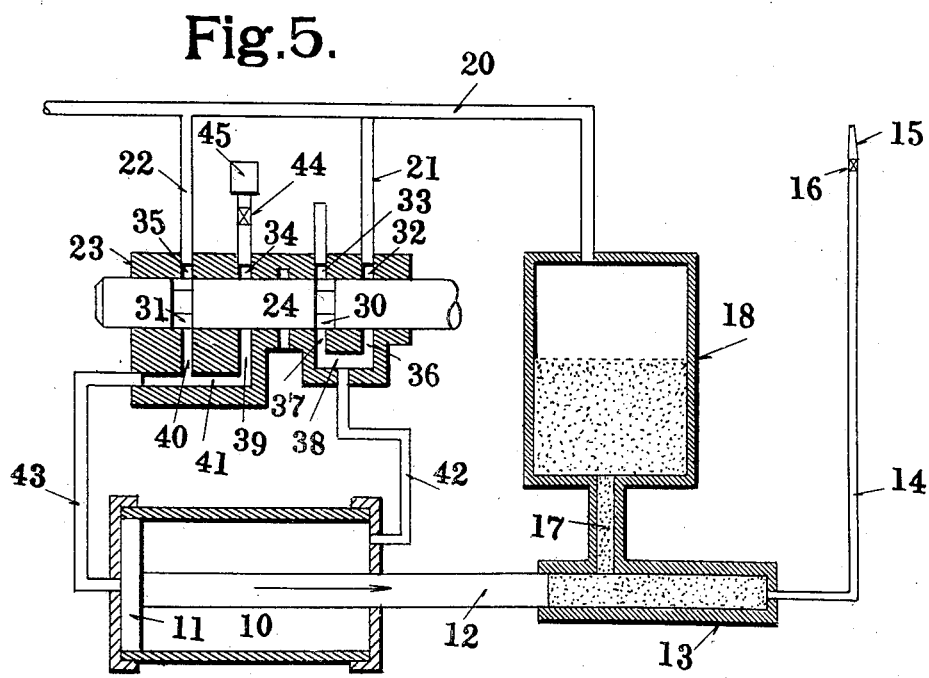

1,673,134

UNITED STATES PATENT OFFICE.

FRANK S. BARKS, OF ST. LOUIS, MISSOURI.

LUBRICATOR.

Application filed January 21, 1925. Serial No. 3,746.

My invention relates to a lubricator and particularly to improvements in that form of lubricator shown and described in my application Serial No. 715,803, filed May 26, 1924, matured into Patent 1,601,490. The object of the present invention is to so modify the lubricator as to adapt it more effectively to deliver quantities of lubricant under high pressure.

In the accompanying drawings, which illustrate one form of lubricator made in accordance with my invention, Figure 1 is a side view partly in section; Figure 2 is an enlarged horizontal section through the controlling valve; Figure 3 is a section taken on the line 3—3 of Figure 2, the valve being shown in a different position; and Figures 4 and 5 are diagrammatic views showing the controlling valve in different positions.

The pump or driving cylinder 10 contains a piston 11, the stem 12 of which forms a plunger in the feed cylinder 13. This feed cylinder 13 is of small diameter relative to the driving piston 11 and terminates in a still smaller flexible grease pipe 14 provided with a nozzle 15 and control valve 16. By thus proportioning the parts I am enabled to deliver the lubricant under high pressure, such as is necessary to force stiff grease through small openings without using unduly high air pressure to drive the device. Grease is delivered to the cylinder 13 through a port 17 from the grease chamber 18. A supply pipe 20 delivers air under pressure to the upper end of the grease chamber 18 and through branch pipes 21 and 22 with the casing 23 of the control valve. Within the casing 23 is a valve stem 24 having an extension 25 carrying spring stops 26 and 27 through which the valve is actuated by an arm 28 on the stem 12 in the same manner as in my prior application above referred to.

Formed in the valve stem 24 are a pair of annular grooves 30 and 31. The groove 30 is adapted to communicate in different positions with lateral ports 32 and 33 in the casing while the groove 31 communicates with ports 34 and 35. The groove 30 also communicates, through ports 36 and 37, with a chamber 38 and the groove 31, through ports 39 and 40, with a chamber 41. The ports 32 and 35 are connected with branch air pipes 21 and 22, respectively, while the chamber 38 is connected by pipe 42 to one end of the cylinder 10 and the chamber 41 by pipe 43 to the other end. The ports 33 and 34 discharge into the atmosphere the latter preferably being provided with a regulating valve 44 and audible signal 45 as in my prior device.

The operation is as follows: Assuming the parts to be in the position shown in the diagrammatic Figure 4, air from the supply pipe 20 will pass through the branch pipe 21, groove 30, port 36, chamber 38, and pipe 42 to the front end of the cylinder 10 so as to force the piston in the direction indicated by the arrow. At the same time the air in the cylinder will be exhausted from the rear end through pipe 43, chamber 41, port 39, groove 31, and port 34 to the atmosphere. As the valve 16 is closed during this operation a vacuum is formed in the cylinder 13 until the port 17 is uncovered by the stem 12 when the grease from the chamber 18, under the combined action of the vacuum in the cylinder and the air pressure in the upper end of the chamber 18, enters and fills the cylinder. The port 17 should remain uncovered an appreciable time before the piston reaches the end of its stroke, as indicated in the drawings, so as to allow sufficient time for the cylinder 13 to completely fill with grease. When the piston 11 completes its stroke the contact of the arm 28 with the stop 26 will move the stem 24 into the position shown in Figure 5. This will cut off the air supply from the branch pipe 21 and allow air from the pipe 22 to pass through port 35, groove 31, port 40, chamber 41, and pipe 43 to the rear end of the cylinder 10, while air from the front end is exhausted through pipe 42, chamber 38, port 37, groove 30, and port 33 to the atmosphere. The piston 11 is thus moved forward until port 17 is covered by stem 12, when, if valve 16 remains closed, the parts will come to rest and so remain until valve 16 is opened to allow the discharge of the grease in the cylinder 13.

Having fully described my invention, what I claim as new and desire to secure by Letters Patent of the United States is:

In a device of the class described, the combination of a lubricant reservoir, a lubricant delivery chamber communicating with said reservoir through a port in the wall of the latter, a piston operating in said chamber to close said port and to force lubricant from the chamber, a motor cylinder and a piston operating therein and actuating the lubricant piston, means maintaining fluid pressure on the motor piston and on the lubricant in the reservoir, said means comprising valve mechanism for automatically reversing the direction of motion of the piston when it reaches the predetermined limit of its stroke in each direction, and a valved lubricant delivery nozzle connected to the said lubricant delivery chamber, whereby opening the nozzle valve initiates operation of the motor piston irrespective of the position of said piston.

In testimony whereof, I have hereunto set my hand this the 16th day of January, 1925.

FRANK S. BARKS.